(12) United States Patent  
de Guglielmo et al.

(10) Patent No.: US 6,179,115 B1  
(45) Date of Patent: Jan. 30, 2001

(54) MECHANICAL DEVICE THREE CHAINS FOR THE CONTINUOUS SPACING AND TRANSFER OF PRODUCTS

(75) Inventors: Pascal de Guglielmo, Montqueux; Alain Cartier, Fontvannes, both of (FR)

(73) Assignee: Aries Packaging, Breviandes (FR)

( * ) Notice: Under 35 U.S.C. 154(b), the term of this patent shall be extended for 0 days.

(21) Appl. No.: 09/094,893

(22) Filed: Jun. 15, 1998

(30) Foreign Application Priority Data

Jun. 13, 1997 (FR) .................................................. 97 07363

(51) Int. Cl.[7] .................................................. B65G 17/16
(52) U.S. Cl. .................................... 198/626.1; 198/475.1; 198/476.1; 198/726; 198/799
(58) Field of Search ............................... 198/474.1, 475.1, 198/799, 626.1, 732, 419.3, 726

(56) References Cited

U.S. PATENT DOCUMENTS

| 1,719,585 | * | 7/1929 | Brown | 198/799 |
| 2,190,783 | * | 2/1940 | Hardy | 198/799 |
| 3,454,142 | * | 7/1969 | Holstein | 198/626.1 |

FOREIGN PATENT DOCUMENTS

| 0 450 915 A1 | * | 2/1991 | (EP) | 198/419.3 |
| 0 708 028 A1 | * | 10/1995 | (EP) | 198/419.3 |

* cited by examiner

*Primary Examiner*—Christopher P. Ellis  
*Assistant Examiner*—Mark A. Deuble  
(74) *Attorney, Agent, or Firm*—Nawrocki, Rooney & Sivertson, P.A.

(57) ABSTRACT

A mechanism for continuously transporting a variety of receptacles with predetermined adjacent spacing. The mechanism uses a first and a second chain driven by a common shaft around identical closed circuits, but vertically offset from one other. These closed circuits have opposed linear sides joined by identical opposed semicircular shaped ends, directed by grooves on opposite sides of a guide block. A vertical support, attached between the first and second chains, traverses the outside of the block. A third chain traverses a second circuit, which is centered and directly below the second chain, directed by a groove in the uppermost side of a horizontal frame positioned under the guide block. This second circuit is identical to the others in shape however it has a greater distance between the semicircular ends. Levers, each equal in length to one half of the third chain circuit elongation, are pivotably attached to the vertical support and to a plate. The plate, also pivotably attached to the third chain, traverses the outside of the guide block to provide stability for the third chain. Vertically oriented pins, integral with spacer elements, provide the levers pivotable attachments. These spacer elements have uniformly spaced indentations sized for the receptacles. The spacer elements are parallel to the chains, face directly outward from the guide block along the linear portions of the circuit, and release the receptacles at the curved circuit ends.

13 Claims, 8 Drawing Sheets

MECHANICAL DEVICE THREE CHAINS FOR THE CONTINUOUS SPACING AND TRANSFER OF PRODUCTS

BACKGROUND OF THE INVENTION

1. Field of the Invention

The invention relates to a continuous product spacing and transfer mechanism.

Such a mechanism can for example be incorporated in a packaging machine for bottles, pots or other receptacles with round, oval, rectangular or polygonal cross sections.

EUROPEAN PATENT APPLICATION

2. Description of Related Art

Document EP-A-450 915 describes a conveying mechanism for a packaging machine in which articles are transported along a feed path and formed into a group for the purpose of subsequently packaging, this mechanism comprising spacing elements mounted on an endless chain.

Other product spacing and conveying mechanisms are described in the following documents: FR-A-2 052 128, FR-A-2 243 894, GB-A-926 776, GB-A-974 995, DE-A-38 39 498, CH-A-520 023, EP-A-60 720, EP-A-709 913, EP-A-708 028, U.S. Pat. No. 3,454,142, U.S. Pat. No. 3,092,234, U.S. Pat. No. 4,757,893, and WO-A-87 06170.

The continuous product spacing and transfer mechanisms of the prior art have a certain number of drawbacks.

The mechanisms conventionally include spacing elements mounted on one or two endless chains, the methods of fixing these spacing elements onto the movable endless chain or two chains not providing a predefined stable positioning of these elements when the conveying mechanism is in operation, particularly at high throughput.

The lack of rigidity of the fixing of the spacing elements on the chain or two chains may allow uncontrolled movements, for example flexing movements, of the spacing elements driven by the chain or two chains.

These uncontrollable unwanted movements may have serious consequences for the conveyed products, which are then no longer grouped together and may possibly be damaged.

This phenomena limits the maximum permissible speed of the spacing and transfer mechanisms of the prior art.

When these mechanisms include spacing elements mounted on two chains, the spacing elements are conventionally disposed between a top plane defined by the top chain and a bottom plane defined by the bottom chain.

So that, when small objects such as pots of yoghurt or the like must be grouped together and transported, the top part of these objects, such as the lid of the pots, is disposed in a plane which may be positioned lower than the top plane defined by the top chain.

Such mechanisms therefore do not allow free access for one or more tools placed above the objects being conveyed, which necessarily complicates the use of these tools.

SUMMARY OF THE INVENTION

The invention relates to a mechanism for transferring and spacing articles which does not have the drawbacks of the known mechanisms of the prior art.

To this end, the invention relates to a continuous transfer and spacing mechanism, this mechanism having a plurality of spacing and transporting elements, movable in a circuit comprising at least one substantially rectilinear section, this mechanism also comprising a first guiding and driving member such as a top endless chain, a second guiding and driving member such as a bottom endless chain, each spacing and transporting element being associated with the first and second guiding and driving members by means of supports, this mechanism having a third guiding and driving member such as an endless chain, each transporting and spacing element being associated with the third guiding and driving member by means of a lever.

Each lever is mounted so as to be able to move in rotation with respect to the third guiding member on a substantially vertical axis situated at a first end part of the lever, the lever also being mounted so as to be able to move in rotation on a substantially vertical axis of each associated support, this axis being situated at the second end part of the lever.

In one embodiment, the first and second guiding members are endless chains or belts, placed opposite each other and one above the other between a control head including a return pulley for the top endless chain, coaxial with a return pulley for the bottom endless chain, the return head including a return pulley for the top endless chain, coaxial with a return pulley for the bottom endless chain.

In one embodiment, the third guiding and driving member is an endless chain or belt placed opposite and below the first and second guiding and driving members, between two return pulleys with a substantially vertical axis.

The axis of the return head is separated by a distance L from the axis of a first return pulley for the third guiding and driving member, this distance L being equal to the distance separating the axis of the control head from the axis of the second return pulley for the third guiding and driving member.

The distance L is substantially equal to the distance separating the rotation axes of the lever.

The top and bottom endless chains define a movement circuit for the supports comprising two substantially rectilinear and parallel sections and two curved lateral end sections.

The endless chain forming the third guiding and driving member is contained in a groove in the frame of the mechanism, this groove comprising two substantially rectilinear and parallel sections and two curved lateral end sections.

Other objects and advantages of the invention will emerge during the following description, a description which will be given with reference to the accompanying drawings in which:

DESCRIPTION OF THE PREFERRED EMBODIMENTS

Figure 1:
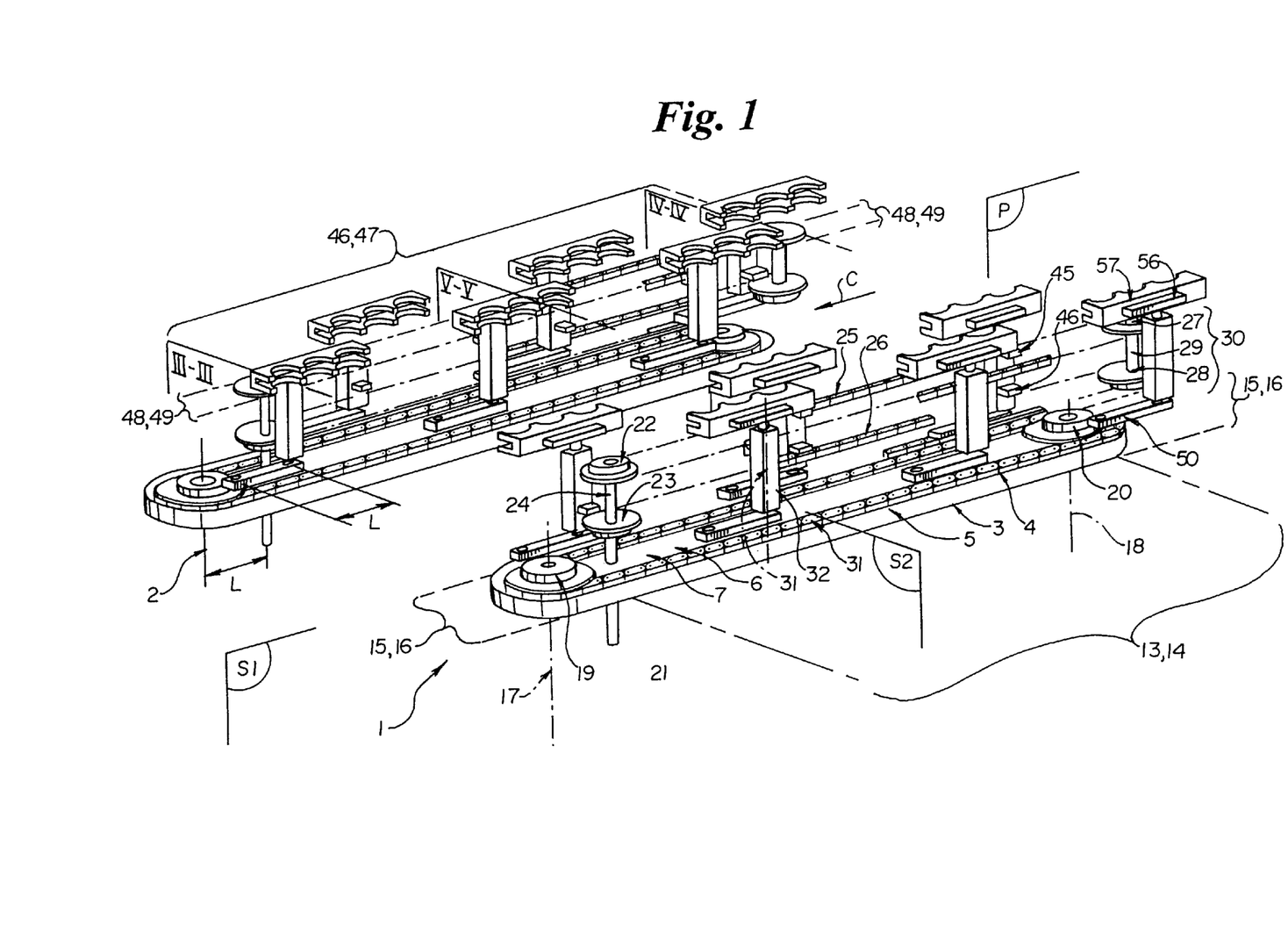
FIG. 1 is a schematic perspective view of a continuous product transfer and spacing mechanism, according to one embodiment of the invention.

The mechanism depicted in FIG. 1 comprises two assemblies 1, 2 placed opposite each other and symmetrical with each other with respect to a substantially vertical plane P, disposed between the assemblies 1 and 2.

Only the assembly 1 will be presented first of all, its possible association with the assembly 2 being the subject of a subsequent description.

The assembly 1 comprises a substantially horizontal frame 3. This frame 3 has, over its entire peripheral length, a groove 4.

This groove 4 is open at least on the top face of frame 3.

This groove 4 is delimited, towards the outside of frame 3, by the substantially vertical outer lateral wall 5 of the frame 3.

This groove 4 is delimited, towards the inside of frame 3, by a substantially vertical inner lateral peripheral wall 6, delimiting a central part 7 of the frame 3.

Figure 2:
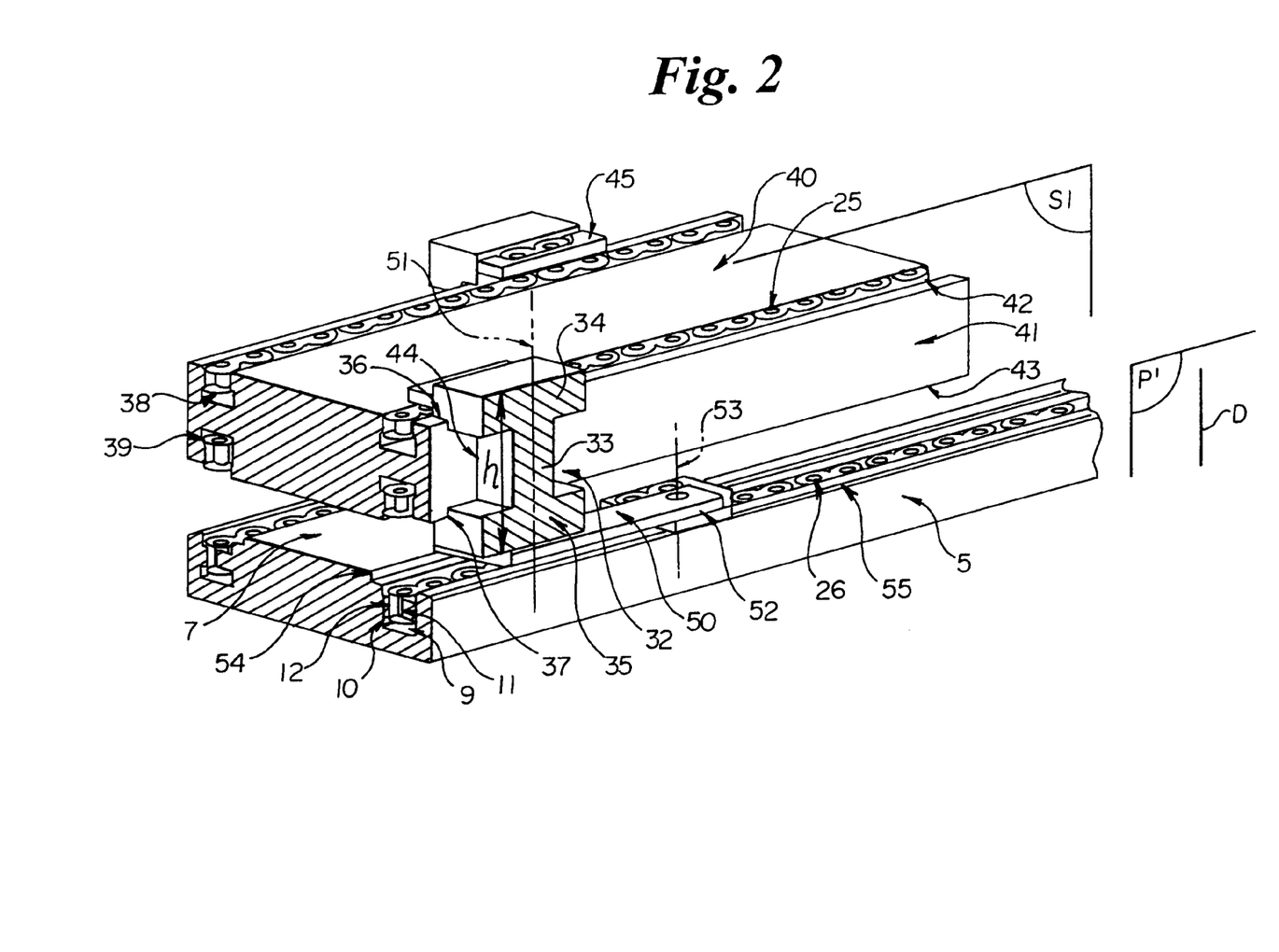
FIG. 2 is a detailed schematic view, in perspective, of the guiding and driving members for the spacing and conveying elements of the mechanism depicted in FIG. 1.
Figure 3:
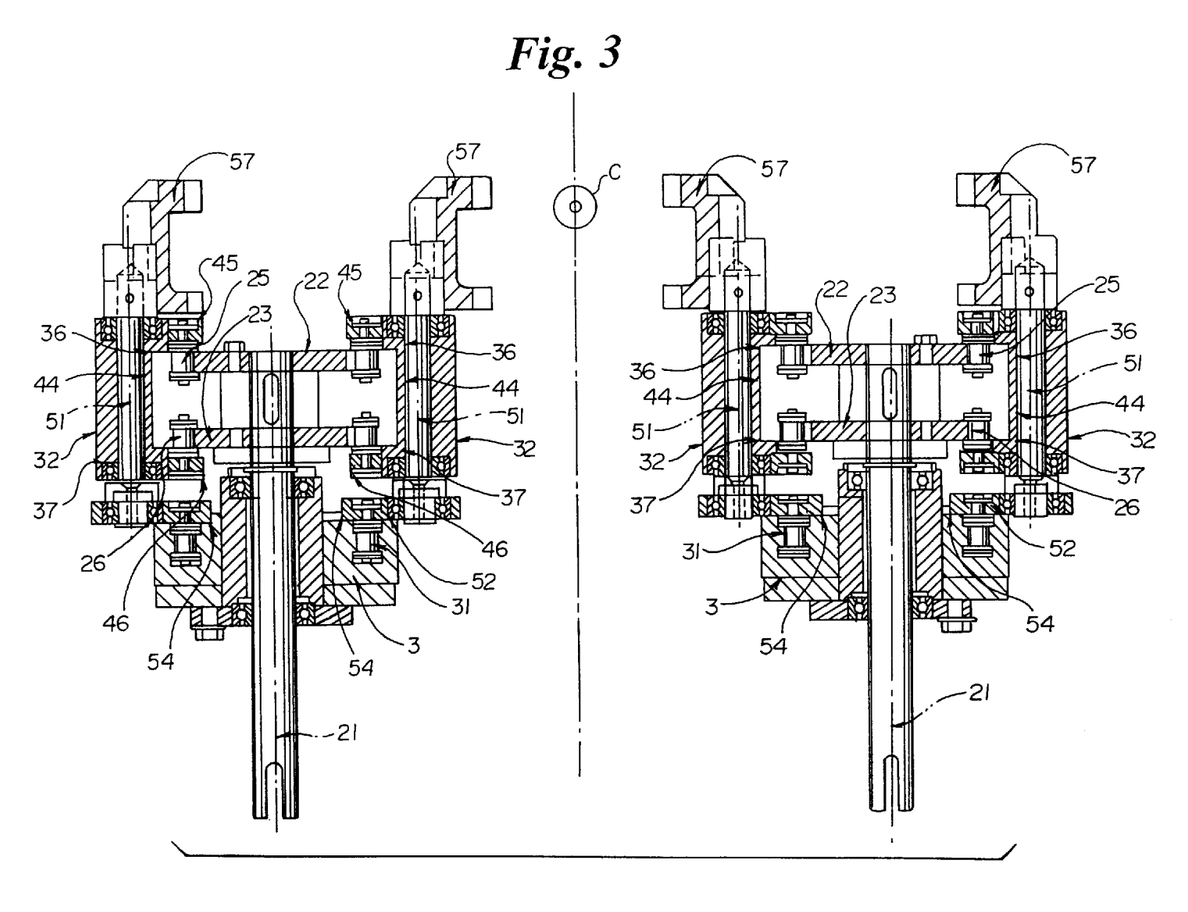
FIG. 3 is a section corresponding to plane III—III in FIG. 1.
Figure 4:
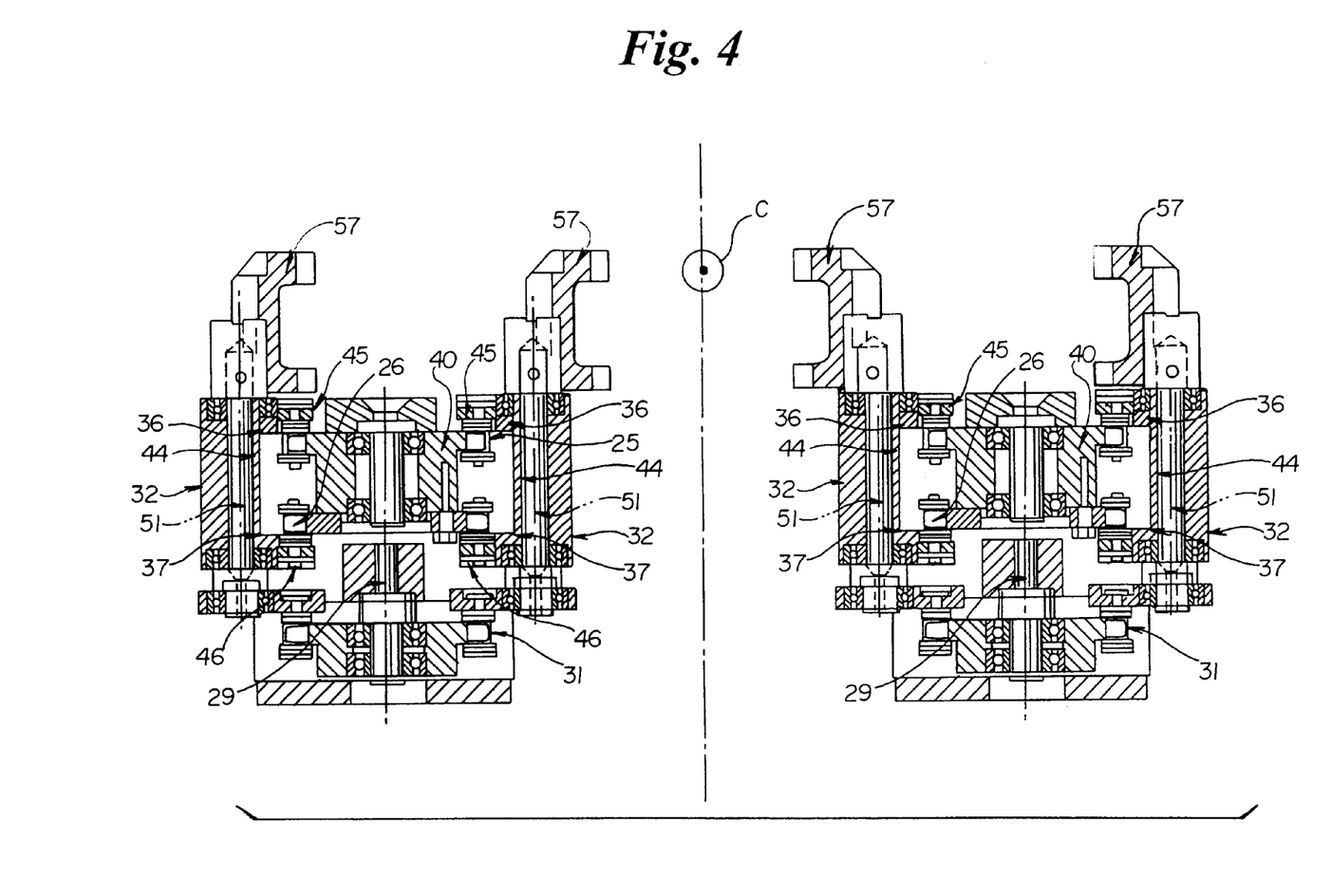
FIG. 4 is a section corresponding to plane IV—IV in FIG. 4.

This groove 4 also has two lateral walls 9, 10, symmetrical with each other with respect to a substantially vertical plane P' parallel to plane P (see FIG. 2).

Each lateral wall 9, 10 has a protrusion 11, 12 forming surfaces for guiding and supporting an endless chain or any other equivalent driving means.

The distance separating lateral walls 9, 10 is substantially constant over the entire circumference of frame 3, so that the width of groove 4 is substantially constant.

Likewise, the depth of groove 4, measured in a direction D of the plane P' is substantially constant over the entire circumference of frame 3.

Groove 4 extends in two substantially rectilinear and parallel sections 13, 14, connected at their ends by two curved sections substantially in the shape of an arc of a circle 15, 16.

Frame 3 exhibits symmetry with respect to a substantially vertical plane S1 situated [half way] halfway between the sections 13, 14 of groove 4.

Frame 3 also exhibits symmetry with respect to a substantially vertical plane S2 perpendicular to plane S1, situated [half way] halfway between curved sections 15, 16 of groove 4.

Frame 3 is substantially rigid. It can be metallic or else produced from polymer, a composite material or any other equivalent material.

In one embodiment, frame 3 is, at least with regard to the walls of groove 4, made from high-density polyamide or any other polymer resistant to wear by friction, which can easily be fabricated and has low moisture absorption and low coefficients of expansion in a humid atmosphere.

Frame 3 supports, in the vicinity of each of the curved sections 15, 16 of groove 4, shafts 17, 18 for return pulleys 19, 20.

These return pulleys 19, 20 are substantially identical and disposed substantially symmetrically with respect to plane S2.

These pulleys 19, 20 are disposed on the top side of frame 3.

Frame 3 also supports a substantially vertical shaft 21 parallel to shafts 17, 18.

This shaft 21 supports two return pulleys for endless chains or any other equivalent driving means.

In the embodiment depicted, two pulleys 22, 23 on a control head 24 enable two chains 25, 26 to change direction. Chains 25, 26 extend in two substantially parallel and horizontal planes, top endless chain 25 being placed opposite bottom endless chain 26.

Two return pulleys 27, 28, similar to return pulleys 22, 23, are supported by a shaft 29 on a return head 30, this return head being fixed to a structure integral with frame 3 and not shown.

Return pulley 22 of top endless chain 25 is therefore coaxial with return pulley 23 of bottom endless chain 26.

Likewise, return pulley 27 of top endless chain 25 is coaxial with return pulley 28 of bottom endless chain 26.

So that endless chains 25, 26 are placed substantially opposite each other, over their entire length.

The mechanism according to the invention can include more than two chains between a control head 24 and a return head 30.

In the embodiment depicted in FIG. 1, shaft 17 of pulley 19 is not connected by a transmission mechanism to shaft 21 of control head 24.

In another embodiment, not shown, a transmission mechanism with a notched, toothed or equivalent belt is disposed between shafts 17 and 21, so that the rotation movement of pulleys 22, 23 of the control head is associated with the rotation movement of return pulley 19.

Shaft 21 can be connected, by a mechanism which is not shown, to an external motive source.

The assembly consisting of pulleys 22, 23, shaft 21, shaft 19, endless chains 25, 26, pulleys 27, 28 and shaft 29 on the one hand and the assembly formed by return pulleys 19, 20 of an endless chain 31 contained in groove 4 can thus have synchronous movements.

Supports 32 are fixed to the chains 25, 26.

These supports have, in the embodiment in FIG. 1, a generally parallelepipedal shape with a substantially square cross section.

FIG. 2 depicts another embodiment of these supports 32.

Supports 32 depicted in FIG. 2 have a parallelepipedal central part 33, extending substantially vertically, and two opposite end parts 34, 35 with an approximately parallelepipedal shape.

Top end part 34 has a bevel 36.

Likewise, bottom end part 35 of supports 32 has a bevel 37.

Chains 25, 26 are contained in grooves 38, 39 with a cross section comparable to that of groove 4.

These grooves 38, 39 are formed in a substantially rigid guide block 40.

This block 40 can be metallic or else produced from polymer, a composite material or any other equivalent material.

In one embodiment, guide block 40 is, [a] at least with regard to the walls of grooves 38, 39, made from high-density polyamide or any other polymer resistant to wear by friction, which can easily be fabricated and has low moisture absorption and low coefficients of expansion in a humid atmosphere.

In this case, supports 32 are preferably metallic.

Guide block 40, just like frame 3, exhibits symmetry with respect to a vertical plane S1 equidistant from grooves 38, 39.

This guide block 40 has a substantially vertical lateral surface 41 and two substantially horizontal surfaces respectively top and bottom 42, 43.

Each support 32 comes into contact, at least partially, with the lateral surface 41 and the circumference of horizontal surfaces 42, 43 of guide block 40.

More precisely, as depicted in FIG. 2, the two faces of bevel 36 on top end part 34 of each support 32 are in contact with the lateral area of block 40 formed by the intersection of lateral surface 41 with top horizontal surface 42.

Likewise, the two faces of bevel 37 on bottom end part 35 of each support 32 are in contact with the lateral area of block 40 formed by the intersection of lateral surface 41 with bottom horizontal surface 43.

Inner face 44 of central part 33 of each support 32 can in addition be in contact with lateral surface 41 of block 40.

Figure 5:
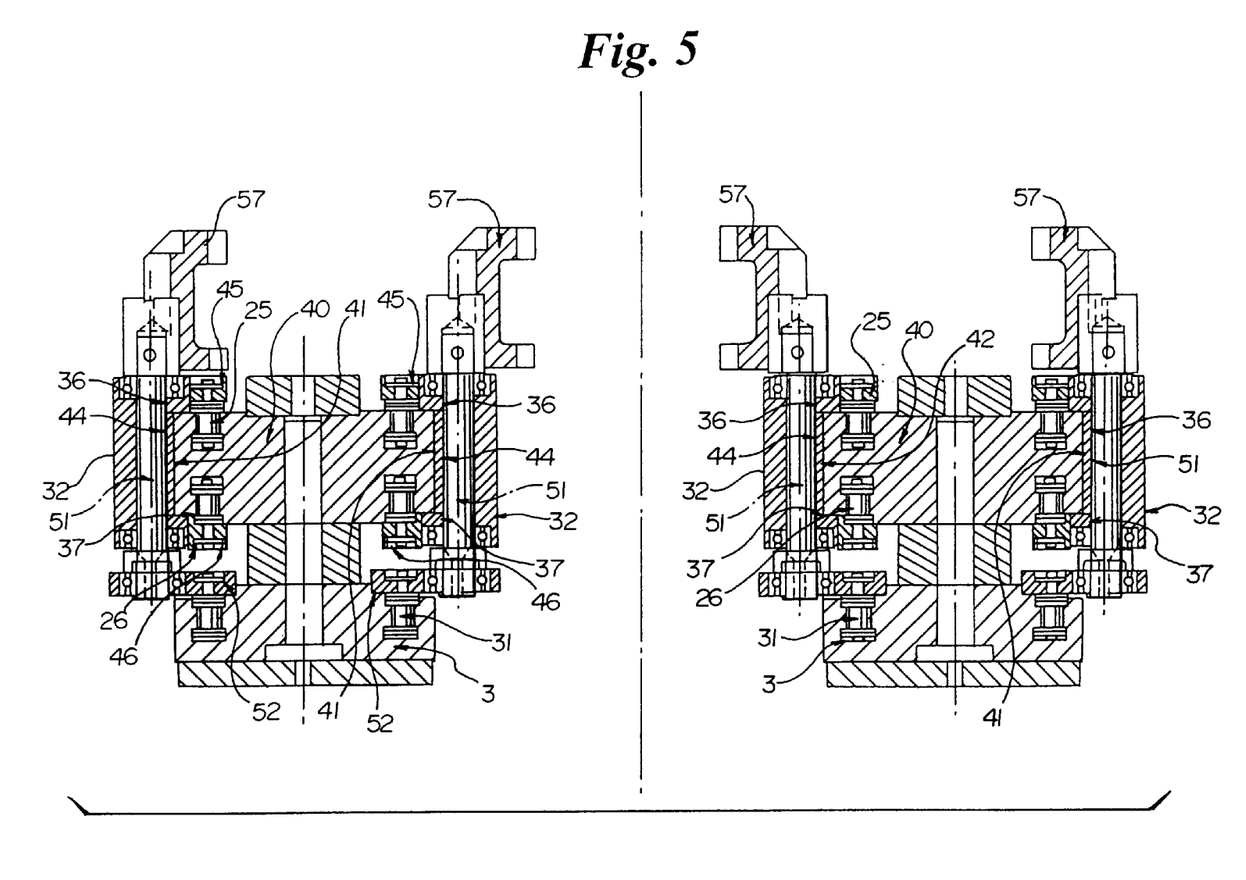
FIG. 5 is a sectional corresponding to plane V—V in FIG. 1.

The contact of bevels 36, 37 on inner face 44 of supports 32 with block 40 takes place essentially over the entire length of rectilinear sections 46, 47 of the circuit of supports 32 (see FIG. 5).

The height h of each support 32 is substantially greater than the distance d separating top endless chain 25 from bottom endless chain 26.

Each support 32 is associated with top endless chain 25 by means of an attachment mechanism 45, optionally removable.

Each support 32 is also associated with bottom endless chain 26 by means of an attachment mechanism 45', optionally removable.

When chains 25, 26 move on their circuit determined by control head 24 and return head 30, the position of supports 32 with respect to block 40 and chains 25, 26 is maintained constant.

A good overall rigidity is obtained by means of the shape of grooves 38, 39, the contact of bevels 36, 37 with block 40 as well as possibly the contact between surface 44 of supports 32 and surface 41 of block 40.

The path of supports 32 comprises two substantially rectilinear sections 46, 47, symmetrical with respect to plane S1, and two curved sections 48, 49 connecting rectilinear sections 46, 47 at their ends.

Each support 32 is connected, at its bottom end, to a lever 50.

This lever 50 is movable in rotation with respect to support 32 about a substantially vertical axis 51.

This lever 50 is movable in rotation with respect to a plate 52, about a substantially vertical axis 53.

This plate 52 comes into abutment against a bevel 54 produced on the peripheral top part of central part 7 of frame 3.

This plate 52 is also guided by its contact with a bevel 55 produced in the peripheral top part of wall 5 of frame 3.

So that, during the movement of a support 32, driven by chains 25, 26, plate 52, associated with chain 31 itself driven in synchronism with chains 25, 26, provides guidance of support 32 and a reinforced holding of the position of axis 51, in particular when the supports are driven at high speed.

When supports 32 move in closed circuit, associated levers 50 remain always substantially parallel to straight sections 13, 14 of groove 4.

Supports 32 have, at their top end, a hooking piece 56 for recesses 57 forming elements for the continuous spacing and transfer of articles.

Recesses 57 are hollows produced in a part made from metal, polymer or other equivalent material. Recesses 57 and their supports 56 are integral with shaft 51.

The length of levers 50 is substantially identical to the distance L separating axes 17 and 21 on the one hand or 18 and 29 on the other hand.

More precisely, the distance separating axes 51, 53 of each lever 50 is substantially equal to the distances separating axes 17 and 21 on the one hand and 18 and 29 on the other hand.

So that recesses 57 always remain disposed in the same direction, namely the direction of the arrows C of the conveying direction, as indicated in FIG. 1.

Recesses 57 can be removable, where necessary.

Figure 6:
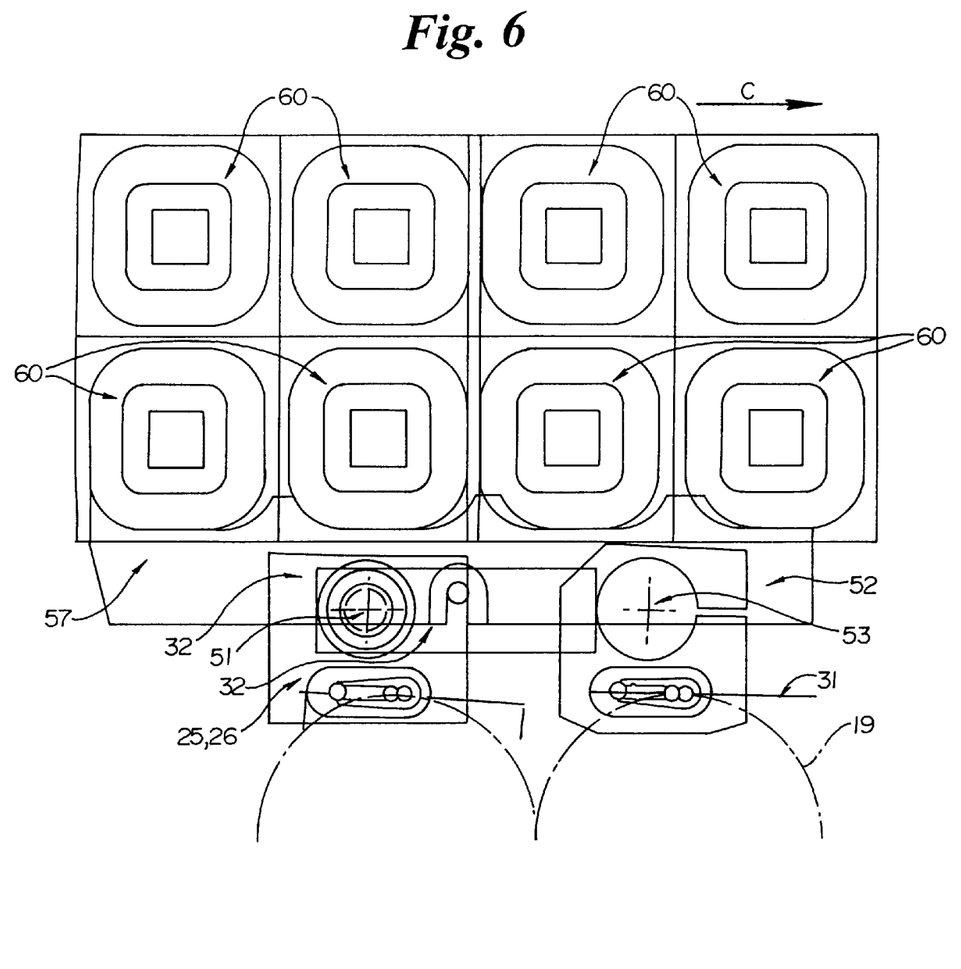
FIGS. 6, 7 and 8 depict three successive steps of releasing a recess with respect to products to be grouped together and transported.
Figure 7:
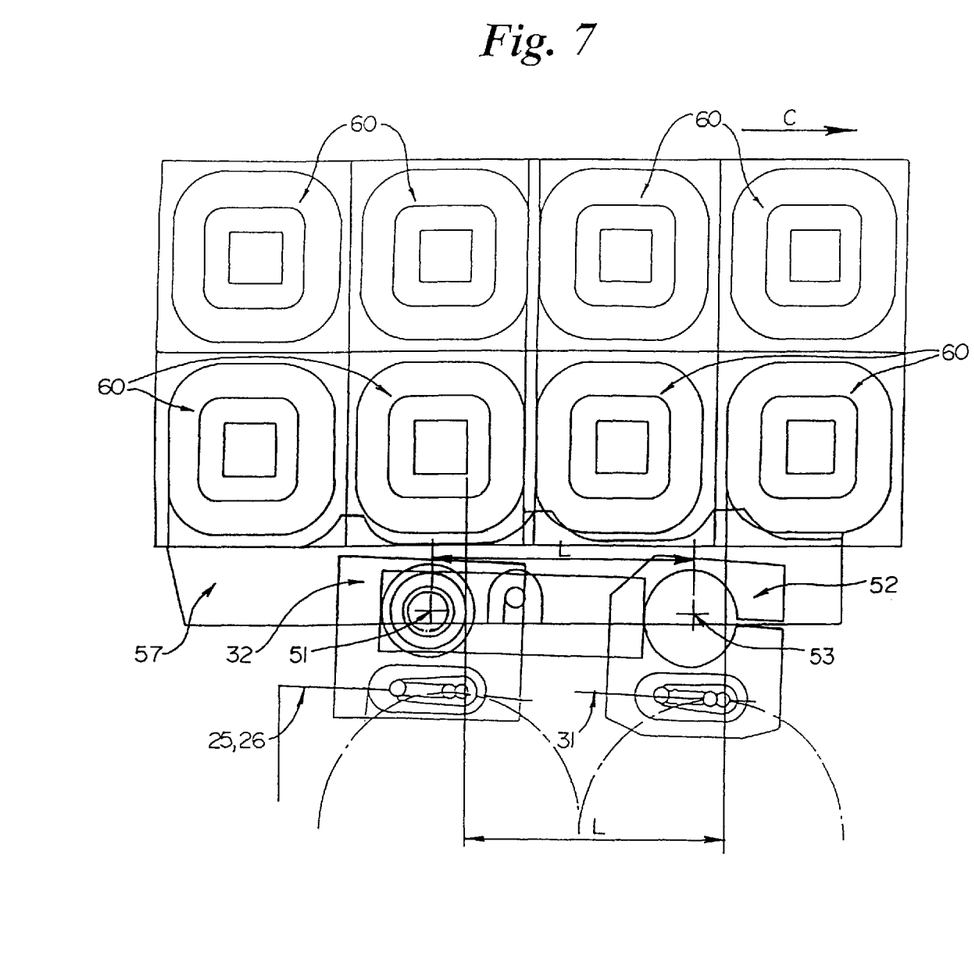
Figure 8:
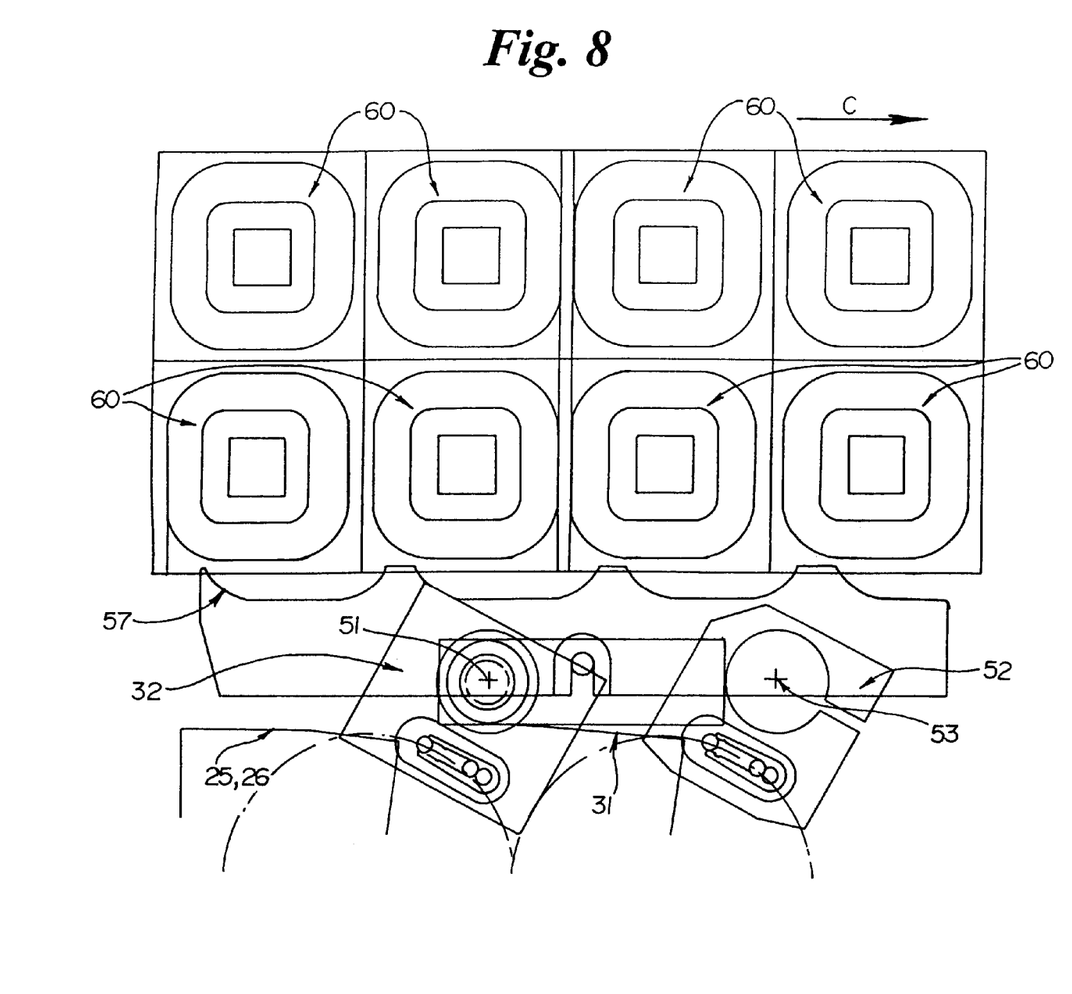

FIGS. 6, 7, and 8 depict three successive steps of the release of a recess 57 with respect to products 60 to be grouped together and transported in the direction C.

In FIGS. 6, 7, and 8, eight articles 60 such as pots made from plastic material or equivalent are transported by a mechanism 1, only one part of which is depicted for purposes of clarity.

By modifying the curvature of groove 4 guiding chain 31, in the end parts of straight sections 13, 14 corresponding respectively to the entry into curved section 15, 16, and the curvature of grooves 38, 39 in the straight sections 46, 47 corresponding respectively to the entry into curved sections 48, 49, the kinetics of recesses 57 is therefore modified locally.

The release, and respectively the engagement, of the recesses from or on articles 60 can thus be accelerated and facilitated, since the curvatures defined above are greater than those related to a simple connecting fillet between the substantially rectilinear sections and the sections in the shape of an arc of a circle of grooves 4, 38, 39.

A mechanism 1 can be placed alone within a packaging line for example.

Or else, as depicted in FIG. 1, two identical mechanisms 1, 2 can be placed opposite each other, the articles to be grouped together and transported then being guided by recesses 57, placed opposite each other, a device, not shown, controlling the synchronism of the movements of the chains of each of two mechanisms 1, 2.

A transporting and spacing device according to the invention has many advantages compared with the known devices of the prior art.

The guidance of spacing elements 57 is particularly precise, which allows high throughput and rapid movements of elements 57.

The shape and size of spacing elements are left to the free choice of the users.

Very high spacing elements are possible, the guidance assembly remaining sufficiently rigid to support the overhang of tools 57.

The entire space situated above a plane tangent to the top edge of tolls 57 is free, which leaves all possibilities of installing a tool above mechanism 1, 2, this tool easily being able to come into contact with the objects grouped together and transported by mechanisms 1, 2.

What is claimed is:

1. A continuous transfer and spacing mechanism, this mechanism having a plurality of spacing and transporting elements movable in a circuit comprising at least one substantially rectilinear section, this mechanism also comprising a flexible first guiding and driving member, a flexible second guiding and driving member, each spacing and transporting element being associated with the first and second guiding and driving members by means of supports, this mechanism being characterised in that it has a third flexible guiding and driving member, each transporting and spacing element being associated with the third guiding and driving member by means of a lever, said lever having stabilizing means for stabilizing the path of said spacing and transporting elements around said circuit, said spacing and transporting elements having modifiable disengagement means for disengaging them from items being transferred and spaced.

2. A transfer and spacing mechanism according to claim 1, characterised in that each lever is mounted so as to be able to move in rotation with respect to the third guiding member on a substantially vertical axis situated at a first end part of the lever, the lever also being mounted so as to be able to move in rotation on a substantially vertical axis of each associated support, this axis being situated at the second end part of the lever.

3. A mechanism according to claim 1, characterised in that the first and second guiding and driving members are endless aligned chains, placed one above the other; said mechanism comprising control head means utilizing synchronously driven upper and lower pulleys for respectively driving said first and second driving members; and comprising including a return pulley for the top endless chain; and further comprising a return pulley for the bottom endless chain, said return pulleys being coaxial.

4. A mechanism according to claim 3, characterised in that the axis of the return head is separated by a distance L from the axis of a first return pulley for the third guiding and driving member, this distance L being equal to the distance separating the axis of the control head from the axis of the second return pulley for the third guiding and driving member.

5. A mechanism according to claim 4, characterised in that the distance L is substantially equal to the distance separating the rotation axes of the lever.

6. A mechanism according to claim 3, characterised in that the top and bottom endless chains define a movement circuit for the supports comprising two substantially rectilinear and parallel sections and two curved lateral end sections.

7. A mechanism according to claim 1, characterised in that the flexible third guiding and driving member is an endless chain placed below the flexible first and second guiding and driving members, and placed between two return pulleys with a substantially vertical axis, the axis of said pulleys being aligned with the planes defined by the top and bottom endless chains.

8. A mechanism according to claim 1 wherein said flexible first and second guiding and driving members are belts.

9. A mechanism according to claim 1 wherein said flexible third guiding and driving member is a belt.

10. A continuous transfer and spacing mechanism, this mechanism having a plurality of spacing and transporting elements movable in a circuit comprising at least one substantially rectilinear section, this mechanism also comprising a first guiding and driving member which is a top endless chain, a second guiding and driving member which is a bottom endless chain, each said spacing and transporting element being associated with the first and second guiding and driving members by means of supports, this mechanism being characterised in that it has a third guiding and driving member which is also an endless chain, each transporting and spacing element being associated with the third guiding and driving member by means of a lever, and in that the third guiding and driving member is an endless chain placed below the first and second guiding and driving members, between two return pulleys with a substantially vertical axis; further characterised in that the mechanism further comprising a frame positioned below the first and second guiding and driving members, said frame having a groove, said groove having two substantially rectilinear and parallel sections and two curved lateral end sections arranged to contain and guide said third guiding and driving member.

11. A mechanism according to claim 10, characterised in that the radius of curvature of the grooves on the entry side and on the exit side of the mechanism is greater than the radius of curvature of a tangential connecting fillet between the substantially rectilinear sections and the sections in the shape of an arc of a circle of the grooves for each of the three chains so that release of the recesses is facilitated at the exit from the mechanism.

12. A continuous transfer and spacing mechanism, this mechanism having a plurality of spacing and transporting elements movable in a circuit comprising at least one substantially rectilinear section, this mechanism also comprising a first guiding and driving member, a top endless chain, a second guiding and driving member, a bottom endless chain, with each said spacing and transporting element being associated with the first and second guiding and driving members by means of supports, this mechanism being characterised in that it has a third guiding and driving member which is also an endless chain, each transporting and spacing element being associated with the third guiding and driving member by means of a lever; further characterised in that each support has a central part and two opposite end parts with an internal face and bevels, the internal face and bevels on the support being substantially in contact with a guide block containing grooves in which the guiding and driving means are housed.

13. A mechanism according to claim 12, characterised in that the guide block is made from high-density polyamide or any other polymer resistant to wear by friction, which can easily be fabricated and has low moisture absorption and low coefficients of expansion in a humid atmosphere.

* * * * *